US012728569B2

(12) United States Patent
Nagata et al.

(10) Patent No.: US 12,728,569 B2
(45) Date of Patent: Sep. 8, 2026

(54) METHOD FOR PRODUCING COATED FIBER-REINFORCED PLASTIC

(71) Applicant: TEIJIN LIMITED, Osaka (JP)

(72) Inventors: Shota Nagata, Osaka (JP); Masanobu Wakita, Osaka (JP)

(73) Assignee: TEIJIN LIMITED, Osaka (JP)

( * ) Notice: Subject to any disclaimer, the term of this patent is extended or adjusted under 35 U.S.C. 154(b) by 314 days.

(21) Appl. No.: 18/289,097

(22) PCT Filed: May 6, 2022

(86) PCT No.: PCT/JP2022/019574

§ 371 (c)(1),
(2) Date: Oct. 31, 2023

(87) PCT Pub. No.: WO2022/259787

PCT Pub. Date: Dec. 15, 2022

(65) Prior Publication Data

US 2024/0217143 A1 Jul. 4, 2024

(30) Foreign Application Priority Data

Jun. 7, 2021 (JP) ................................ 2021-095364

(51) Int. Cl.
*B29C 37/00* (2006.01)
*B29C 70/46* (2006.01)
*B29C 70/76* (2006.01)

(52) U.S. Cl.
CPC .......... *B29C 37/0028* (2013.01); *B29C 70/46* (2013.01); *B29C 70/76* (2013.01)

(58) Field of Classification Search
CPC ..... B29C 37/0028; B29C 70/46; B29C 70/76; B29C 70/78; B29C 70/763
See application file for complete search history.

(56) References Cited

U.S. PATENT DOCUMENTS 4,235,833 A 11/1980 Arnason et al.
6,190,587 B1 * 2/2001 Cittadini ................ B29C 41/22 264/46.4

(Continued)

FOREIGN PATENT DOCUMENTS

CN 1235895 A 11/1999
DE 2461925 A1 * 11/1975

(Continued)

OTHER PUBLICATIONS

English Abstract of WO 2016/104416 A1 published Jul. 30, 2016 (Applicant: Toray Industries).

(Continued)

*Primary Examiner* — S. Behrooz Ghorishi
(74) *Attorney, Agent, or Firm* — Sughrue Mion, PLLC

(57) ABSTRACT

Provided is a method for applying pressure to a coating material and a fiber-reinforced plastic using a male-female pair of upper and lower molds and producing a coated fiber-reinforced plastic, wherein: the fiber-reinforced plastic includes at least a first surface A, a second surface B, and an end surface C connecting to the first surface A and the second surface B; the first surface A and the second surface B each face separate molds when pressure is applied to the fiber-reinforced plastic using the male-female pair of upper and lower molds; from the start to the end of pressure application, the coating material first comes into contact with at least part of the first surface A, and then the coating material comes into contact with at least part of at least one of the second surface B and the end surface C, whereby the fiber-reinforced plastic is coated; and any of the two surfaces and the end surface of the fiber-reinforced plastic are coated within the mold through the method for producing a coated fiber-reinforced plastic.

14 Claims, 7 Drawing Sheets

(56) References Cited

U.S. PATENT DOCUMENTS

| | | | |
|---|---|---|---|
| 2003/0227109 | A1 | 12/2003 | Kitamura et al. |
| 2021/0001517 | A1 | 1/2021 | Ichino et al. |
| 2022/0204808 | A1 | 6/2022 | Kawai |

FOREIGN PATENT DOCUMENTS

| | | | |
|---|---|---|---|
| EP | 0625418 | A1 | 11/1994 |
| EP | 1207031 | A1 | 5/2002 |
| JP | 3-178407 | A | 8/1991 |
| JP | 3-203614 | A | 9/1991 |
| JP | 4-168037 | A | 6/1992 |
| JP | 2006-160792 | A | 6/2006 |
| JP | 2015-20364 | A | 2/2015 |

OTHER PUBLICATIONS

English Abstract of JP 2-155723 A published Jun. 14, 1990 (Applicant: Toray Industries).

English Abstract of JP 2010-167662 A published Aug. 5, 2010 (Applicant: Dainippon Toryo Co., Ltd.).

English Abstract of JP 2010-253806 A published Nov. 11, 2010 (Applicant: Housetec Inc.).

International Search Report (PCT/ISA/210) dated Jun. 14, 2022, issued by International Searching Authority for International Application No. PCT/JP2022/019574.

Written Opinion (PCT/ISA/237) dated Jun. 14, 2022, issued by International Searching Authority for International Application No. PCT/JP2022/019574.

* cited by examiner

METHOD FOR PRODUCING COATED FIBER-REINFORCED PLASTIC

CROSS-REFERENCE TO RELATED APPLICATIONS

This application is a National Phase Entry of PCT International Application No. PCT/JP2022/019574 filed on May 6, 2022, which claims priority to Japanese Patent Application No. 2021-095364 filed on Jun. 7, 2021, the contents of all of which are incorporated herein by reference in their entirety.

TECHNICAL FIELD

The present invention relates to a method for producing a coated fiber-reinforced plastic.

BACKGROUND ART

Fiber-reinforced plastics are lightweight and have excellent mechanical properties, and therefore are widely used in sporting goods applications, aerospace applications, and general industrial applications. As a method of forming a coating film on a surface of the fiber-reinforced plastic, spray coating, electrostatic coating, or electrodeposition coating is known, but in-mold coating such as an in-mold coating method or an open press coating method is also widely used. FIG. 9 is a schematic view showing an example of coating of fiber-reinforced plastic by the in-mold coating method. In the in-mold coating method shown in FIG. 9, after the molding material is compression-molded, the forming upper mold 15 is slightly raised to form a gap between the molded body 14 and the forming upper mold 15, and the coating material 4 is injected in the gap. But there is also a method of injecting the coating material 4 at a high pressure without forming the gap. FIG. 10 is a schematic view showing an example of coating of fiber-reinforced plastic by an open mold coating method.

Patent Literature 1 uses an in-mold coating method to form an insulating layer or a conductive layer on a surface of a fiber-reinforced plastic.

Patent Literatures 2 and 3 use an open-press coating method to form a coating film on a sheet molding compound or a component.

Patent Literature 4 discloses a molding method in which a cavity mold is replaced after injection molding, and a decorative film is formed on the molded product by the decorative cavity mold.

CITATION LIST

Patent Literature

Patent Literature 1: International Publication 2016/104416
Patent Literature 2: JP-A-1990-155723
Patent Literature 3: JP-A-2020-183456
Patent Literature 4: JP-A-2003-311843

SUMMARY

Technical Problem

However, in the in-mold coating method described in Patent Literature 1, since the coating material is injected immediately after the fiber-reinforced plastic is molded, only one surface of the fiber-reinforced plastic can be coated. In particular, since burrs are usually generated on an end surface of the fiber-reinforced plastic immediately after molding, the end surface of the fiber-reinforced plastic or the back surface of the surface to which the coating material is injected on (coated) is not coated.

Further, in the case where a portion in which burrs are generated on an end surface and a portion in which no burrs are present are unevenly distributed, a portion in which no burrs are present is coated. But thereafter, when the end surface is scraped by a file or the like to remove the burrs, the portion in which no burrs are present is inevitably also filed, and the coating is peeled off.

FIGS. 11 and 12 are schematic views showing an example of coating of fiber-reinforced plastic by an in-mold coating method. FIG. 11 is a schematic view immediately after molding of the fiber-reinforced plastic 18 and immediately before injecting a coating material. FIG. 12 is a schematic view showing a state in which the forming upper mold 15 and the forming lower mold 16 are slightly opened and the coating material 4 is injected after the fiber-reinforced plastic 18 is molded. A burr 19 is generated on an end surface of the fiber-reinforced plastic 18 in FIGS. 11 and 12, and the flow of the coating material 4 is prevented by the burr 19, so that the end surface of the fiber-reinforced plastic 18 or the back surface of the surface to which the coating material 4 is injected (coated) cannot be coated.

In the open press coating method described in Patent Literatures 2 and 3, coating of an end surface of the fiber-reinforced plastic has not been studied.

In the molding method of Patent Literature 4, since the core mold is commonly used, it is not possible to coat an end surface of the molded product or a back surface of a surface on which the coating material is applied. Patent Literature 4 does not describe a fiber-reinforced plastic.

In view of the problems of the prior art, it is an object of the present invention to provide a method of manufacturing a coated fiber-reinforced plastic in which coating is performed on either one of both surfaces and an end surface of the fiber-reinforced plastic in a mold.

Solution to Problem

As a result of intensive studies, the present inventors have found that the above-described problems can be solved by the following means. Thus, the present invention has been completed.

<1>

A method for producing a coated fiber-reinforced plastic by pressing a coating material and a fiber-reinforced plastic using a pair of upper and lower molds, the fiber-reinforced plastic including at least a first surface A, a second surface B, and an end surface C connected to the first surface A and the second surface B, wherein the first surface A and the second surface B are surfaces each facing different molds when the fiber-reinforced plastic is pressed using the pair of upper and lower molds, and the coating material first comes into contact with at least a part of the first surface A and then comes into contact with at least a part of at least one of the second surface B and the end surface C to coat the fiber-reinforced plastic.

<2>

The method for producing a coated fiber-reinforced plastic according to <1>, wherein the coating material first comes into contact with at least a part of the first surface A from the start of pressing to the end of pressing, and then comes into contact with at least a part of the end surface C.

<3>

The method for producing a coated fiber-reinforced plastic according to <1>, wherein the coating material first comes into contact with at least a part of the first surface A from the start of pressing to the end of pressing, and then comes into contact with at least a part of the second surface B and at least a part of the end surface C.

<4>

The method for producing a coated fiber-reinforced plastic according to <1>, wherein the upper mold is an upper mold for coating and the lower mold is a lower mold for coating, respectively, and the fiber-reinforced plastic is molded using a forming upper mold and a forming lower mold, then removed from the forming upper mold and the forming lower mold, and then pressed using the upper mold for coating and the lower mold for coating.

<5>

The method for producing a coated fiber-reinforced plastic according to <4>, wherein the fiber-reinforced plastic is deformed after being removed from the forming upper mold and the forming lower mold, and then pressed using the upper mold for coating and the lower mold.

<6>

The method for producing a coated fiber-reinforced plastic according to <5>, wherein the fiber-reinforced plastic contains a thermoplastic resin.

<7>

The method for producing a coated fiber-reinforced plastic according to <6>, wherein the thermoplastic resin is a crystalline resin.

<8>

The method for producing a coated fiber-reinforced plastic according to <6> or <7>, wherein the fiber-reinforced plastic is obtained by molding and then removing burrs.

<9>

The method for producing a coated fiber-reinforced plastic according to any one of <1> to <8> the method comprising:

disposing the fiber-reinforced plastic in the lower mold;

applying the coating material on an upper part of the fiber-reinforced plastic; and starting the pressing.

<10>

The method for producing a coated fiber-reinforced plastic according to <1> or <2> above, wherein the fiber-reinforced plastic is obtained by molding a sheet molding compound and then removing burrs.

<11>

The method for producing a coated fiber-reinforced plastic according to (10), wherein a clearance occurred when the forming upper mold and the forming lower mold are closed is larger than a clearance occurred when the forming upper mold and the forming lower mold used for molding the sheet molding compound are closed.

<12>

The method for producing a coated fiber-reinforced plastic according to any one of <1> to <11>, wherein the lower mold has at least one convex portion on a surface of the lower mold.

<13>

The method for producing a coated fiber-reinforced plastic according to any one of <1> to <12>, wherein the lower mold has at least one through hole, and the pressing is performed while the fiber-reinforced plastic is sucked by a vacuum pump via the through hole.

<14>

The method for producing a coated fiber-reinforced plastic according to any one of <1> to <13>, wherein the coating material is at least one selected from the group consisting of a primer coating material, an appearance design coating material, a conductive coating material, an electromagnetic wave shielding coating material, and a fire-resistant coating material.

<15>

The method for producing a coated fiber-reinforced plastic according to any one of (1) to (14), wherein the coating material is a reactive coating material.

Advantageous Effect of the Invention

According to the present invention, it is possible to provide a method of manufacturing a coated fiber-reinforced plastic in which coating is performed on either of both surfaces and end surfaces of the fiber-reinforced plastic in a mold.

BRIEF DESCRIPTION OF DRAWINGS

FIG. 5 is a schematic diagram for describing an example of a coating step of the fiber-reinforced plastic.

DESCRIPTION OF EMBODIMENTS

Figure 1:
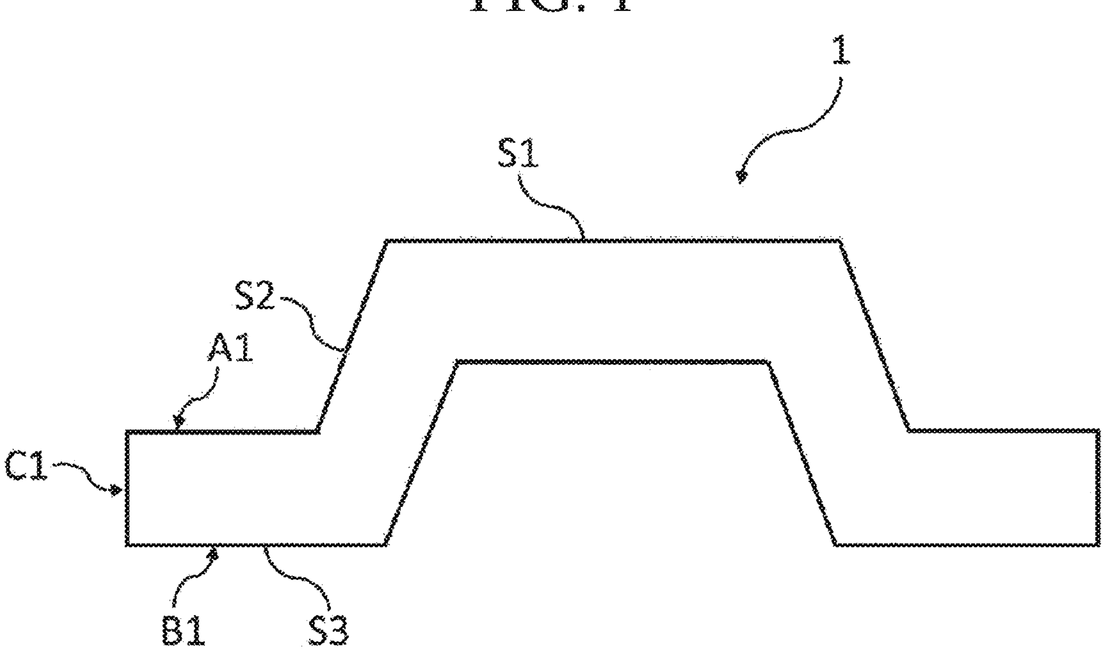
FIG. 1 is a schematic view showing an example of a fiber-reinforced plastic.

A method for producing a coated fiber-reinforced plastic includes: pressing a coating material and a fiber-reinforced plastic using a pair of upper and lower molds to produce a coated fiber-reinforced plastic material, the fiber-reinforced plastic including at least a first surface A, a second surface B, and an end surface C connected to the first surface A and the second surface B, wherein the first surface A and the second surface B are surfaces each facing different molds when the fiber-reinforced plastic is pressed using the pair of upper and lower molds, and the coating material first comes into contact with at least a part of the first surface A and then comes into contact with at least a part of at least one of the second surface B and the end surface C to coat the fiber-reinforced plastic.

[Fiber-Reinforced Plastic]

The fiber-reinforced plastic includes at least reinforcing fibers and a matrix resin.

1. Reinforcing Fiber

The reinforcing fibers contained in the fiber-reinforced plastic are not particularly limited, but it is preferable that one or more reinforcing fibers are selected from the group consisting of carbon fibers, glass fibers, aramid fibers, boron fibers, and basalt fibers. The reinforcing fibers are more preferably glass fibers. When the glass fibers are used as the reinforcing fibers, the average fiber diameter of the glass fibers is preferably 1 μm to 50 μm, and more preferably 5 μm to 20 μm. When the average fiber diameter is 1 μm or more, the impregnating property of the resin into the fibers is good, and when the average fiber diameter is 50 μm or less, moldability and processability are good.

2. Discontinuous Fiber

The reinforcing fibers preferably include discontinuous fibers. When discontinuous fibers are used, formability is improved compared to a fiber-reinforced plastic using only continuous fibers, and it becomes easy to produce a molded body having a complicated shape.

3. Weight Average Fiber Length of Reinforcing Fibers

The weight average fiber length of the reinforcing fibers is preferably 1 mm or more, more preferably 1 mm or more and 100 mm or less, still more preferably 1 mm or more and 70 mm or less, and particularly preferably 1 mm or more and 50 mm or less.

When the weight average fiber length of the reinforcing fibers is 1 mm or more, it is easy to impart structural rigidity to the fiber-reinforced plastic itself. In the fiber-reinforced plastic prepared by injection molding, the weight average fiber length of the reinforcing fibers is about 0.1 mm to 0.3 mm. Therefore, when the weight average fiber length of the reinforcing fibers is 1 mm or more and 100 mm or less, it is preferable to prepare the fiber-reinforced plastic by compression molding.

It is preferable because the fluidity is excellent when the weight average fiber length of the reinforcing fibers is 100 mm or less.

In the present invention, discontinuous reinforcing fibers having different fiber lengths may be used in combination. In other words, the discontinuous reinforcing fibers used in the present invention may have a single peak or a plurality of peaks in a distribution of the weight average fiber length.

4. Fiber Volume Fraction

The fiber volume fraction Vf of the reinforcing fibers is not particularly limited, but is preferably 20% to 70%, more preferably 25% to 60%, and still more preferably 30% to 55%.

The fiber volume fraction (Vf unit: volume %) is a ratio of the volume of the reinforcing fibers to the total volume of the fiber-reinforced plastic including not only the reinforcing fibers and the matrix resin but also other additives and the like.

5. Matrix Resin

The type of the matrix resin is not particularly limited, and a thermosetting resin or a thermoplastic resin is used.

When the thermosetting resin is used, it is preferably one or more resins selected from the group consisting of an unsaturated polyester resin, a vinyl ester resin, an epoxy resin, and a phenol resin.

As a preferable embodiment of the present invention, an embodiment in which the fiber-reinforced plastic contains a thermoplastic resin is exemplified. The thermoplastic resin may be crystalline or amorphous, but is preferably a crystalline resin.

A thermoplastic resin that can be used as the matrix resin is not particularly limited. As the thermoplastic resin, a thermoplastic resin having a softening point in a range of 180° C. to 350° C. is generally used, but the thermoplastic resin is not limited thereto.

Examples of the thermoplastic resin include a polyolefin resin, a polystyrene resin, a thermoplastic polyamide resin, a polyester resin, a polyacetal resin (polyoxymethylene resin), a polycarbonate resin. (meth)acrylic resin, a polyarylate resin, a polyphenylene ether resin, a polyimide resin, a polyether nitrile resin, a phenoxy resin, a polyphenylene sulfide resin, a polysulfone resin, a polyketone resin, a polyether ketone resin, a thermoplastic urethane resin, a fluorine-based resin, and a thermoplastic polybenzimidazole resin.

Examples of the polyolefin resin include polyethylene resin, polypropylene resin, polybutadiene resin, polymethylpentene resin, vinyl chloride resin, vinylidene chloride resin, vinyl acetate resin, and polyvinyl alcohol resin.

Examples of the polystyrene resin include polystyrene resin, acrylonitrile-styrene resin (AS resin), acrylonitrile-butadiene-styrene resin (ABS resin), and the like.

Examples of the polyamide resin include polyamide 6 resin (nylon 6), polyamide 11 resin (nylon 11), polyamide 12 resin (nylon 12), polyamide 46 resin (nylon 46), polyamide 66 resin (nylon 66), and polyamide 610 resin (nylon 610).

Examples of the polyester resin include polyethylene terephthalate resin, polyethylene naphthalate resin, polybutylene terephthalate resin, polytrimethylene terephthalate resin, and liquid crystal polyester.

Examples of the (meth)acrylic resin include polymethyl methacrylate.

Examples of the modified polyphenylene ether resin include modified polyphenylene ether and the like.

Examples of the thermoplastic polyimide resin include thermoplastic polyimide, polyamide-imide resin, and polyetherimide resin.

Examples of the polysulfone resin include a modified polysulfone resin and a polyether sulfone resin.

Examples of the polyether ketone resin include a polyether ketone resin, a polyether ether ketone resin, and a polyether ketone ketone resin.

Examples of the fluorine-based resin include polytetrafluoroethylene and the like.

One kind of the matrix resin may be used alone, or two or more kinds thereof may be used in combination.

6. Other Agents

The fiber-reinforced plastic may contain additives such as various fibrous fillers of organic fibers or inorganic fibers or non-fibrous fillers, an inorganic filler, a flame retardant, a UV resistance agent, a stabilizer, a mold release agent, a pigment, a softening agent, a plasticizer, and a surfactant within a range not impairing the object of the present invention.

When the thermosetting resin is used as the matrix resin, it may contain a thickener, a curing agent, a polymerization initiator, a polymerization inhibitor, or the like.

One kind of the additive may be used alone, or two or more kinds may be used in combination.

7. Sheet Molding Compound

The fiber-reinforced plastic is preferably formed by molding a sheet molding compound (sometimes referred to as SMC) using reinforcing fibers. Due to its high moldability, the sheet molding compound has a higher fluidity and moldability than continuous fibers, and can be easily molded even in a complicated shape.

As the fiber-reinforced plastic using the sheet molding compound (SMC), a sheet molding compound manufactured by Continental Structural Plastics Ltd. (sometimes abbreviated as CSP) can be used.

[Deburring of Sheet Molding Compound]

Figure 13:
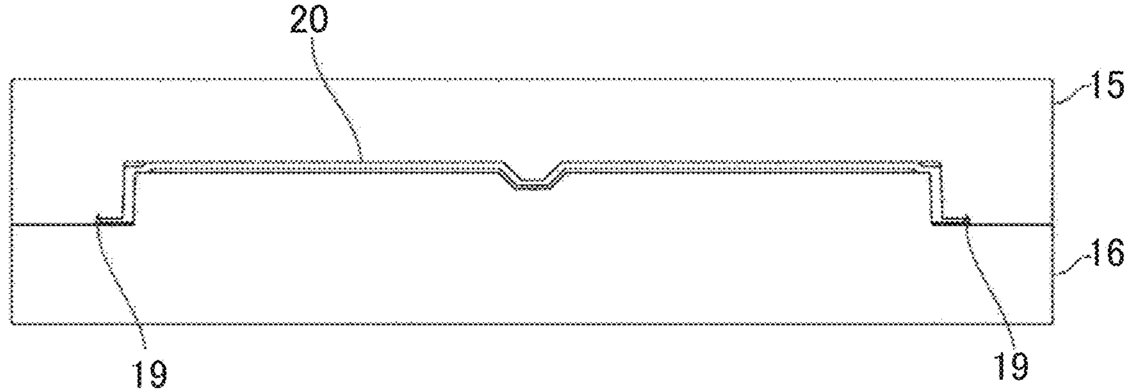
FIG. 13 is a schematic diagram showing an example of compression-molding of a sheet molding compound.

The fiber-reinforced plastic is preferably obtained by molding a sheet molding compound (SMC) and then removing burrs. When SMC is compression-molded, burrs are usually generated on an end surface of the obtained molded body (fiber-reinforced plastic). When the amount of SMC to be used is small, burrs are not generated, but a short shot occurs and a defective product is obtained. FIG. 13 is a schematic diagram showing an example of compression-molding of the SMC20. The SMC 20 in FIG. 13 is compression-molded, and a burr 19 is generated on an end surface thereof. The burr 19 can be removed by a known method.

The fiber-reinforced plastic includes at least a first surface A, a second surface B, and an end surface C connected to the first surface A and the second surface B.

The first surface A and the second surface B are surfaces each facing different molds when the fiber-reinforced plastic is pressed using a pair of upper and lower molds.

Here, facing a mold with a surface having a fiber-reinforced plastic means that the surface and the mold face each other, but the surface and the mold may or may not be in contact with each other.

It is preferable that the first surface A faces the upper mold, and the second surface B faces the lower mold, or the first surface A faces the lower mold, and the second surface B faces the upper mold.

When the first surface A faces the upper mold and the second surface B faces the lower mold, a distance between the first surface A and the upper mold is shorter than a distance between the second surface B and the upper mold, and a distance between the first surface A and the lower mold is longer than a distance between the second surface B and the lower mold.

When the first surface A faces the lower mold and the second surface B faces the upper mold, a distance between the first surface A and the upper mold is longer than a distance between the second surface B and the upper mold, and a distance between the first surface A and the lower mold is shorter than a distance between the second surface B and the lower mold.

The end surface C is preferably a surface that is the same as an end surface of a molding material (typically, a plate-shaped molding material) used for molding the fiber-reinforced plastic, or a surface corresponding to an end surface of the molding material. The same surface as the end surface of the molding material refers to a surface that is an end surface of the molding material. The surface corresponding to the end surface of the molding material refers to a surface that is an end surface of the molding material whose shape and size are changed by molding of the molding material.

An angle between the first surface A and the end surface C is not particularly limited, but may be, for example, 60° or more and 120° or less, or 80° or more and 100° or less.

An angle between the second surface B and the end surface C is not particularly limited, but may be, for example, 60° or more and 120° or less, or 80° or more and 100° or less.

The first surface A and the second surface B may be parallel to each other or may intersect each other. When the first surface A and the second surface B intersect with each other, an angle between the first surface A and the second surface B is not particularly limited, but may be, for example, 45° or less, or 30° or less.

The first surface A, the second surface B, and the end surface C of the fiber-reinforced plastic may be flat or curved, respectively.

The shape of the fiber-reinforced plastic is not limited as long as it has a first surface A, a second surface B, and an end surface C.

The fiber-reinforced plastic may have a surface other than the first surface A, the second surface B, and the end surface C.

FIG. 1 is a schematic diagram showing an example of a fiber-reinforced plastic. The fiber-reinforced plastic 1 of FIG. 1 has a top plane portion S1, a standing plane portion S2, and a flange portion S3, and is a molded body having a hat-shaped cross section in a thickness direction. The fiber-reinforced plastic 1 in FIG. 1 includes a surface A1 corresponding to the first surface A, a surface B1 corresponding to the second surface B, and a surface C1 corresponding to the end surface C and connecting the surfaces A1 and B1 on the flange portion S3.

Figure 2:
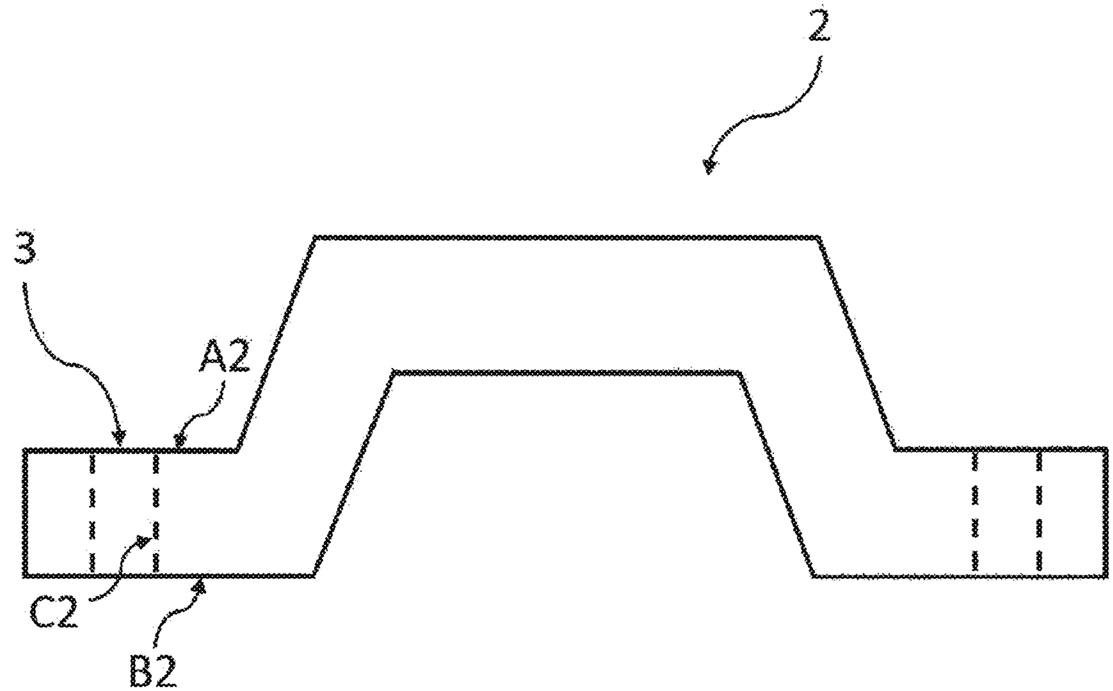
FIG. 2 is a schematic view showing an example of a fiber-reinforced plastic.

The end surface C is not limited to a surface present in an end portion of the fiber-reinforced plastic, and may be, for example, a surface of a hole in the fiber-reinforced plastic. FIG. 2 is a schematic diagram showing an example of the fiber-reinforced plastic. The fiber-reinforced plastic 2 in FIG. 2 is the same as the fiber-reinforced plastic 1 in FIG. 1 except that a hole 3 penetrating in a thickness direction is provided in a flange portion. The fiber-reinforced plastic 2 in FIG. 2 includes a surface A2 corresponding to the first surface A, a surface B2 corresponding to the second surface B. and a surface C2 corresponding to the end surface C and connecting the surfaces A2 and B2. The surface C2 is a surface of the hole 3.

[Coating Material]

The coating material is not particularly limited.

The coating material may be a coating material having no reactivity or a coating material having reactivity (reactive coating material), but is preferably a reactive coating material.

The reactive coating material is not particularly limited, but is preferably a coating material containing a compound that is cured by heat.

Examples of the reactive coating material include: a two-component curable urethane resin-based coating material of a polyol and a polyisocyanate; and an acrylic resin-based coating material containing a radical polymerization monomer or oligomer and a peroxide.

When a two-part coating material is used, it is preferable that the two-part coating material is a type in which a curing agent (resin) is mixed with a main agent (coating liquid). The mixing ratio is also appropriately determined by the coating product. In addition, the amounts to be used can be mixed on site. In the two-liquid coating material, a chemical reaction is caused by mixing two liquids of a main agent and a curing agent at a predetermined ratio, and the performance of the coating material is maximized by binding molecules tightly. Since the molecules are dense, it is possible to produce a strong coating film in which the adhesion between the coating film and the base is increased and is stable.

On the other hand, when a one-liquid coating material is used, components are adjusted so that coating can be performed only with a main agent (coating liquid), and the coating material can be used as it is only by opening the can and diluting the coating material. Therefore, it is simple to handle and can be used relatively easily. Further, even if a coating material remains, it can be used next time by storing in a predetermined method.

The coating material for use in the present invention is not particularly limited, but is preferably at least one selected from the group consisting of a primer coating material, an appearance design coating material, a conductive coating material, an electromagnetic wave shielding coating material, and a fire-resistant coating material.

[Coating Process]

In the method for producing a coated fiber-reinforced plastic of the present invention, a step of pressing the coating material and the fiber-reinforced plastic using a pair of upper and lower molds is also called a coating step.

As described above, the fiber-reinforced plastic includes at least a first surface A, a second surface B, and an end surface C connected to the first surface A and the second surface B.

In the coating step, from the start of pressing to the end of pressing, the coating material first comes into contact with at least a part of the first surface A of the fiber-reinforced plastic, and then comes into contact with at least a part of at least one of the second surface B and the end surface C. The coating material flows in a mold by being pressed so that the coating material comes into contact with at least one of the first surface A, the second surface B, and the end surface C to form a coating film, thereby the fiber-reinforced plastic is coated. That is, coating can be performed on either of both surfaces and end surfaces of the fiber-reinforced plastic in the mold.

In the present invention, at least a part of the second surface B and at least a part of the end surface C may be coated by a coating step in addition to at least a part of the first surface A may be coated: at least a part of the second surface B only may be coated: or at least a part of the end surface C only may be coated.

In the present invention, it is preferable that the coating material first comes into contact with at least a part of the first surface A and then comes into contact with at least a part of the end surface C from the start of pressing to the end of pressing. Accordingly, the end surface C is coated.

In the present invention, it is more preferable that, from the start of pressing to the end of pressing, the coating material first comes into contact with at least a part of the first surface A, and then comes into contact with at least a part of the second surface B and at least a part of the end surface C. Accordingly, the second surface B and the end surface C are coated.

In the coating step, for example, there may be the following cases (1) to (4).

(1) Case where a fiber-reinforced plastic is placed on a lower mold, a coating material is applied on an upper part of the fiber-reinforced plastic, and pressing is started In the case of (1), the first surface A faces the upper mold, and the second surface B faces the lower mold.

In the case of (1), the "upper part of the fiber-reinforced plastic" means a surface of the fiber-reinforced plastic that is not a surface facing the lower mold and is not an end surface. The "upper part of the fiber-reinforced plastic" may be the first surface A or may be a surface connected to the first surface A.

In the case of (1), a coating material is applied on at least a part of an "upper part of the fiber-reinforced plastic".

When the "upper part of the fiber-reinforced plastic" is the first surface A, the coating comes into contact with the first surface A when the coating is applied on the upper surface of the fiber-reinforced plastic. In the case where the "upper part of the fiber-reinforced plastic" is a surface connected to the first surface A (a surface facing the same upper mold as the first surface A), the coating material is coated on the fiber-reinforced plastic, and the coating material flows by being pressed, so that the coating material comes into contact with the first surface A.

Further, the coating material flows from the first surface A to the end surface C and the second surface B by being pressed.

In this manner, the coating material first comes into contact with at least a part of the first surface A from the start of pressing to the end of pressing, and then comes into contact with at least a part of at least one of the second surface B and the end surface C, so that the fiber-reinforced plastic is coated.

(2) Case where a fiber-reinforced plastic is placed on a lower mold, a coating material is applied to the upper mold, and pressing is started In the case of (2), the first surface A faces the upper mold, and the second surface B faces the lower mold.

In the case of (2), a coating material is applied to an upper mold instead of applying the coating material on the upper part of the fiber-reinforced plastic in the case of (1).

In the case of (2), a coating material is applied to at least a part of the upper mold.

When the coating material is applied to the upper mold, similarly to the case of (1), the fiber-reinforced plastic is coated when the coating material first comes into contact with at least a part of the first surface A from the start of pressing to the end of pressing, and then comes into contact with at least a part of at least one of the second surface B and the end surface C. In this case, coating starts by transferring the coating material applied to the upper mold to the first surface A.

(3) Case where a coating material is applied to a lower mold, the fiber-reinforced plastic is placed on the lower mold, and pressing is started In the case of (3), the first surface A faces the lower mold, and the second surface B faces the upper mold.

In the case of (3), a coating material is applied on the lower mold before the fiber-reinforced plastic is placed on the lower mold, and then the fiber-reinforced plastic is placed on the lower mold.

In the case of (3), a coating material is applied to at least a part of the lower mold.

When the fiber-reinforced plastic is disposed on the lower mold, a surface in contact with the coating material applied to the lower mold may be the first surface A, or a surface (a surface facing the lower mold) connected to a surface in contact with the coating material applied to the lower mold may be the first surface A. When the surface of the fiber-reinforced plastic in contact with the coating material applied to the lower mold is the first surface A, the coating material comes into contact with the first surface A when the fiber-reinforced plastic is disposed in the lower mold. In the case where the surface of the fiber-reinforced plastic in contact with the coating material applied to the lower mold is a surface connected to the first surface A, the fiber-reinforced plastic is disposed in the lower mold and is pressed to flow the coating material, whereby the coating material is in contact with the first surface A.

Further, the coating material flows from the first surface A to the end surface C and the second surface B by being pressed.

In this manner, the coating material first comes into contact with at least a part of the first surface A from the start of pressing to the end of pressing, and then comes into contact with at least a part of at least one of the second surface B and the end surface C, so that the fiber-reinforced plastic is coated.

(4) Case where the coating material comes into contact with the first surface A and the second surface B when pressing is started The present invention also includes a fiber-reinforced plastic coated by the coating material first contacting at least a part of a first surface A and at least a part of a second surface B from the start of pressing to the end of pressing, and then contacting at least a part of an end surface C.

In the case of (4), the first surface A faces the upper mold or the lower mold, and the second surface B faces the lower mold or the upper mold.

In the case of (4), there is a case in which, after applying a coating material on at least a part of the lower mold, the fiber-reinforced plastic is disposed in the lower mold, another coating material is applied to at least a part of the upper part of the fiber-reinforced plastic, and the pressing is started. In addition, there is a case in which, after applying a coating material at least a part of the lower mold, the fiber-reinforced plastic is disposed on the lower mold, another coating material is applied to at least a part of the upper mold, and the pressing is started.

In this manner, the coating material first comes into contact with at least a part of the first surface A and at least a part of the second surface B from the start of pressing to the end of pressing, and then comes into contact with at least a part of the end surface C, whereby the fiber-reinforced plastic is coated.

The coating step is preferably the case of (1) above in which the fiber-reinforced plastic is placed in a lower mold, a coating material is applied on the upper part of the fiber-reinforced plastic, and the pressing is started.

Figure 3:
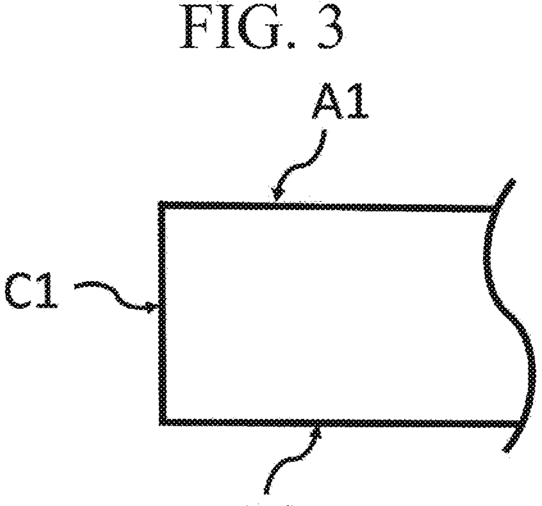
FIG. 3 is a schematic view showing an example of an end portion of a fiber-reinforced plastic.
Figure 4:
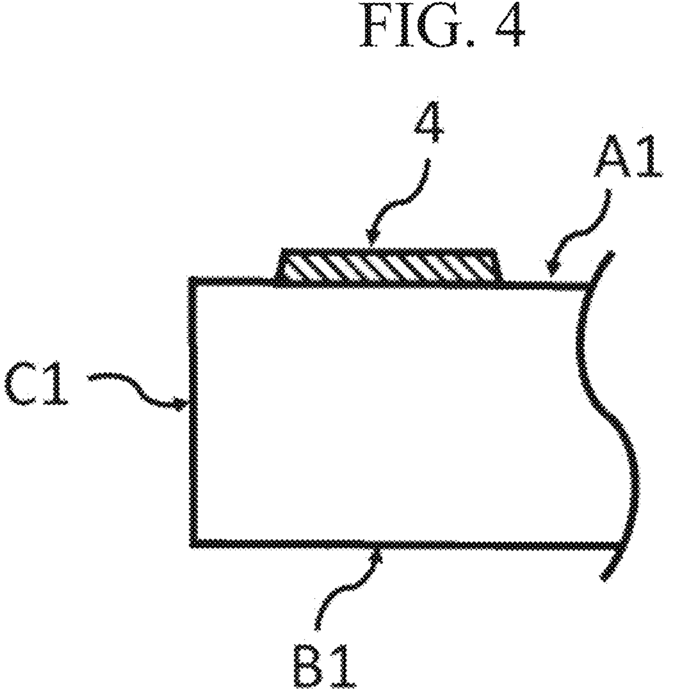
FIG. 4 is a schematic diagram for describing an example of a coating step of the fiber-reinforced plastic.
Figure 5:
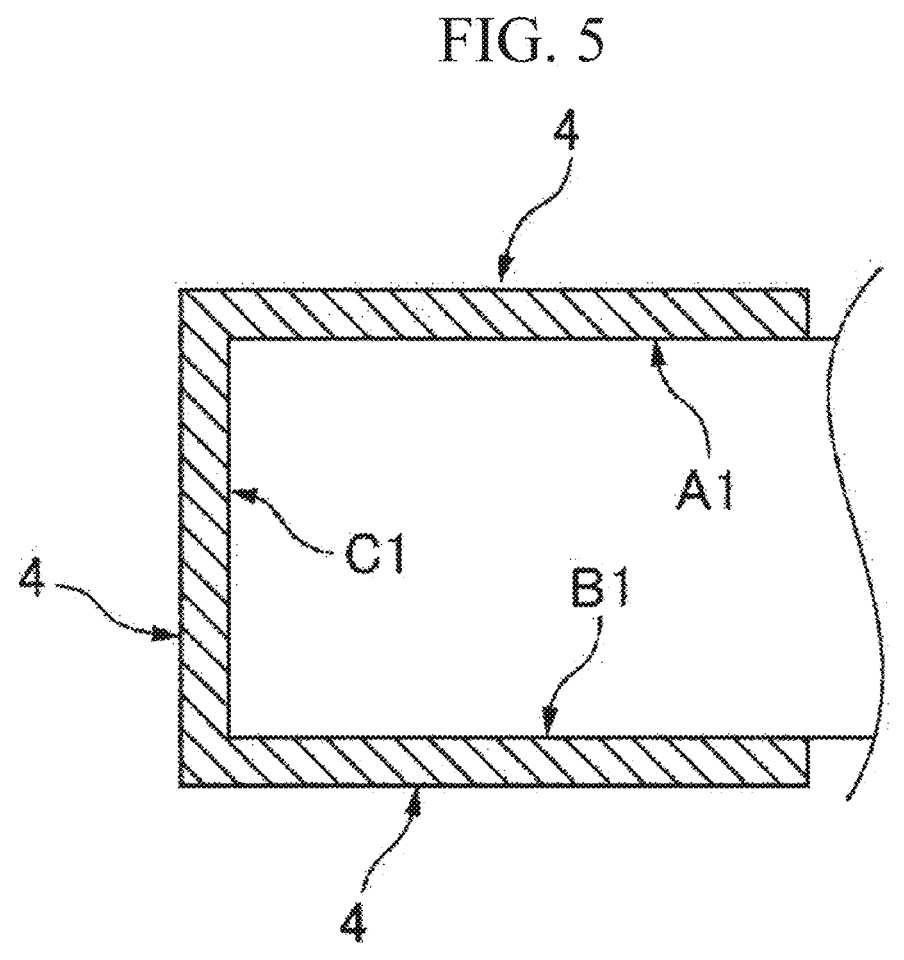

As an example, a case of coating the fiber-reinforced plastic 1 in FIG. 1 will be specifically described. In this case, first, the fiber-reinforced plastic 1 in FIG. 1 is disposed in a lower mold. FIG. 3 is a schematic view of an end portion of a flange portion of the fiber-reinforced plastic 1 disposed in the lower mold. In FIG. 3, the lower mold is not shown. Next, a coating material is applied on the upper part of the fiber-reinforced plastic. Here, the upper part of the fiber-reinforced plastic means a surface that is not a surface facing the lower mold and is not an end surface. For example, as shown in FIG. 4, the coating material 4 is coated on a surface A1 which is on the upper part of the fiber-reinforced plastic (the coating material 4 comes into contact with a part of the surface A1). A method of applying the coating material is not particularly limited, and the coating material can be applied using a known method. After applying the coating material, the upper mold and the lower mold are closed to start pressing. The coating material 4 in FIG. 4 is pressed to flow to the end surface C1 and the surface B1 (the coating material 4 comes into contact with a part of the end surface C1 and the surface B1). In this manner, as shown in FIG. 5, a coating film with the coating material 4 is formed on the surface A1, the end surface C1, and the surface B1, and the fiber-reinforced plastic is coated.

As described above, the "upper part of the fiber-reinforced plastic" on which the coating material may be applied may be the first surface A as shown in FIG. 4, or may be a surface connected to the first surface A (for example, the surface of the top plane portion S1 in FIG. 1, the surface of the standing plane portion S2, or the like).

(Pair of Upper and Lower Molds for Use in Coating Process)

It is preferable that the pair of upper and lower molds used in the coating step is different from forming molds of the fiber-reinforced plastic.

In the present invention, it is preferable that the upper mold and the lower mold are an upper mold for coating and a lower mold for coating, respectively, and the fiber-reinforced plastic is molded using a forming upper mold and a forming lower mold, then removed from the forming upper mold and the forming lower mold, and then pressed using the upper mold for coating and the lower mold for coating.

In the present invention, it is preferable that the fiber-reinforced plastic is deformed after being removed from the forming upper mold and the forming lower mold, and then the fiber-reinforced plastic is pressed using the upper mold for coating and the lower mold for coating.

When a resin containing no fibers is molded as described in Patent Literature 4, almost no warpage occurs in the obtained molded product. On the other hand, in the fiber-reinforced plastic, warpage is likely to occur after molding due to anisotropy or the like based on the orientation of the fibers. Further, the fiber-reinforced plastic is easily deformed by cure shrinkage after completion of molding. Therefore, when the fiber-reinforced plastic is removed from the forming upper mold and the forming lower mold, the fiber-reinforced plastic does not enter the same mold, and therefore, it is preferable that the upper mold for coating and the lower mold for coating have shapes different from those of the forming upper mold and the forming lower mold, respectively.

In particular, compared to SMC using a thermoplastic resin as a matrix resin, in the case of using a thermosetting resin as a matrix resin, the corner portion tends to warp greatly over a period of about 5 minutes from after molding. When the molded article is coated without being separated from the core mold (before the molded article is warped) as in Patent Literature 4, there is a possibility that the coating may be peeled off. In contrast, this problem is less likely to occur when the coating is performed after fitting the molded article again into the coating mold after the warpage as in the above aspect of the present invention. In addition, since a crystalline resin (for example, polyamide or polypropylene) has a higher tendency to increase warpage than an amorphous resin (for example, polycarbonate), the above embodiment of the present invention can be more effectively utilized.

It is preferable that the fiber-reinforced plastic using the thermoplastic resin is also obtained by molding and then removing the burr. The burr can be removed by cutting out the burr at the end portion of the fiber-reinforced plastic.

Preferred embodiments (a) to (c) of the upper mold and the lower mold used in the coating step will be described below.

(a) Upper Mold and Lower Mold with Adjusted Clearance Generated when Closed

It is preferable that a clearance generated when the upper mold and the lower mold used in the coating step are closed is larger than a clearance generated when the forming upper mold and the forming lower mold used when the fiber-reinforced plastic is molded (preferably, the forming upper mold and the forming lower mold used when the sheet molding compound is molded) are closed.

If the clearance generated when the upper mold and the lower mold used in the coating step are closed is larger than the clearance generated when the forming upper mold and the forming lower mold used when the fiber-reinforced plastic is molded are closed, a gap is formed between the fiber-reinforced plastic and at least one of the upper mold and the lower mold when the upper mold and the lower mold are closed in the coating step. Accordingly, the coating material can easily flow from the first surface A to at least a part of at least one of the second surface B and the end surface C from the start of pressing to the end of pressing, so that coating of the fiber-reinforced plastic can be efficiently performed.

Figure 6:
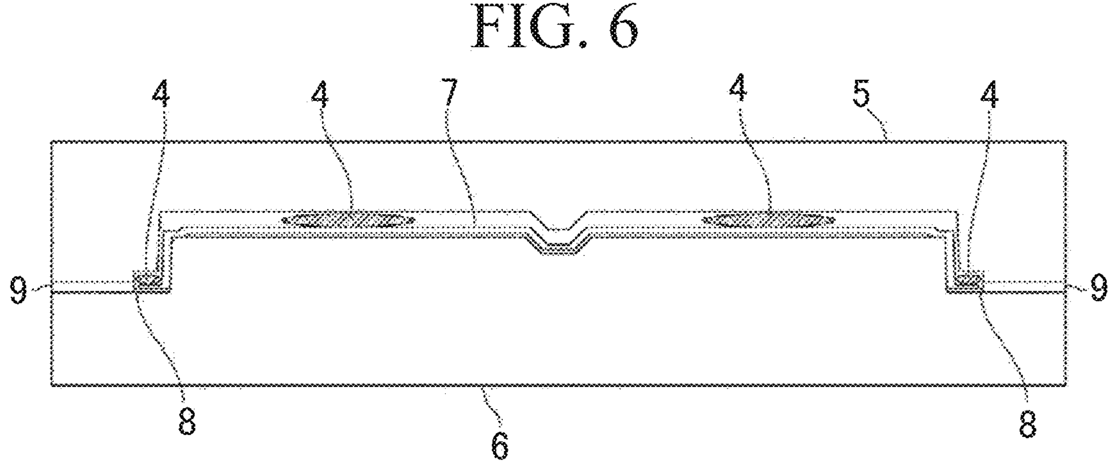
FIG. 6 is a schematic view showing an example of a coating step of the fiber-reinforced plastic.

FIG. 6 shows a schematic view of an example of the coating step. In FIG. 6, a gap 8 is formed between the fiber-reinforced plastic 7 and at least one of the upper mold 5 and the lower mold 6 when the upper mold 5 and the lower mold 6 are closed, and the coating material 4 easily flows from the first surface A to the end surface C and the second surface B.

In FIG. 6, the seal 9 is provided so that the coating material 4 does not leak out of the mold, but in the present invention, the seal is not essential. In order to prevent the coating material from leaking out of the mold, for example, a shape of the mold can be devised in addition to the seal. In addition, in order to prevent shortage of the coating material due to leakage of the coating material out of the mold, a larger amount of the coating material can be used in consideration of a leak amount in addition to the seal.

The upper mold and the lower mold used in the coating step may be the same as or different from the upper mold and the lower mold used in the molding step.

By cutting a part of the molded body (fiber-reinforced plastic) obtained in the molding step, the clearance generated when the upper mold and the lower mold used in the coating step are closed can be larger than the clearance generated when the forming upper mold and the forming lower mold used when the fiber-reinforced plastic is molded are closed.

(b) Lower Mold Having Convex Portion

It is also preferable to have at least one convex portion on the surface of the lower mold used in the coating step. When at least one convex portion is provided on the surface of the lower mold used in the coating step, a gap is formed between the fiber-reinforced plastic and the lower mold when the upper mold and the lower mold are closed in the coating step. Accordingly, the coating material can easily flow from the first surface A to at least a part of at least one of the second surface B and the end surface C from the start of pressing to the end of pressing, so that coating of the fiber-reinforced plastic can be efficiently performed.

Figure 7:
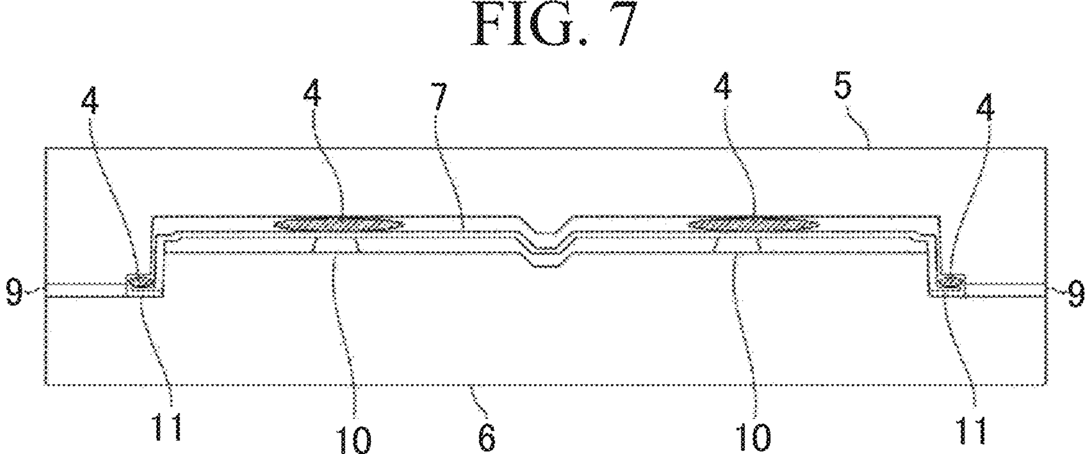
FIG. 7 is a schematic diagram showing an example of a coating step of the fiber-reinforced plastic.

FIG. 7 is a schematic diagram of an example of a coating step. In FIG. 7, a convex portion 10 is provided on the surface of the lower mold 6, and a gap 11 is formed between the fiber-reinforced plastic 7 and the lower mold 6 when the upper mold 5 and the lower mold 6 are closed, and the coating material 4 easily flows from the first surface A to the second surface B.

(c) Lower Mold Having Suction Mechanism

It is also preferable that the lower mold used in the coating step has at least one through hole, and pressing is performed while the fiber-reinforced plastic is sucked by a vacuum pump via the through hole. By sucking the fiber-reinforced plastic by the vacuum pump, the fiber-reinforced plastic can be fixed, and it is possible to prevent the fiber-reinforced plastic from moving during pressing and hindering the flow of the coating material.

Figure 8:
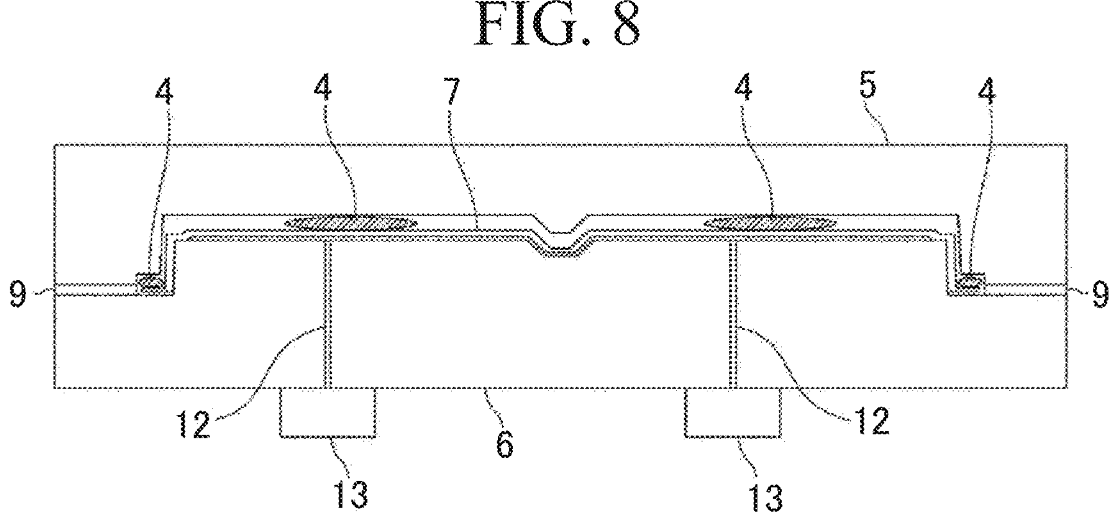
FIG. 8 is a schematic diagram showing an example of a coating step of the fiber-reinforced plastic.
Figures 9, 10:
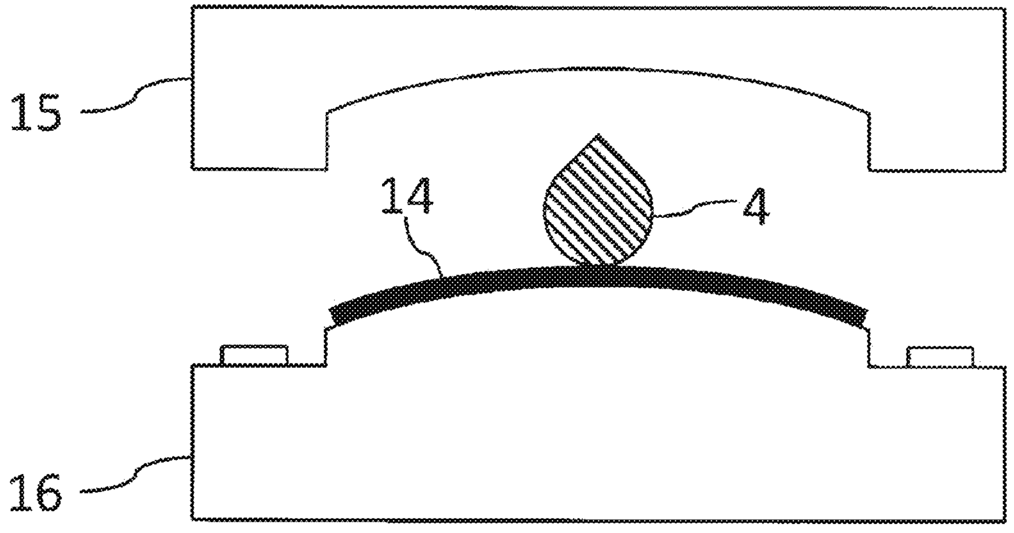
FIG. 9 is a schematic diagram showing an example of coating of the fiber-reinforced plastic by an in-mold coating method.
FIG. 10 is a schematic diagram showing an example of coating of the fiber-reinforced plastic by an open mold coating method.
Figure 11:
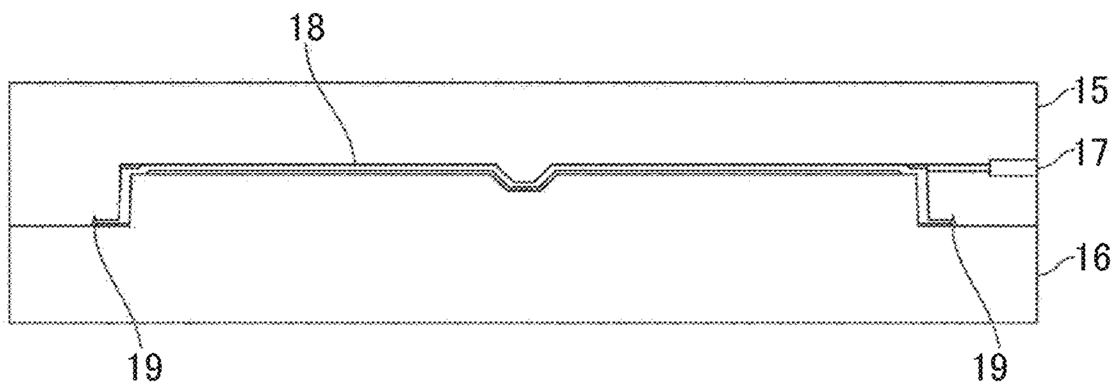
FIG. 11 is a schematic view showing an example of coating of the fiber-reinforced plastic by an in-mold coating method.
Figure 12:
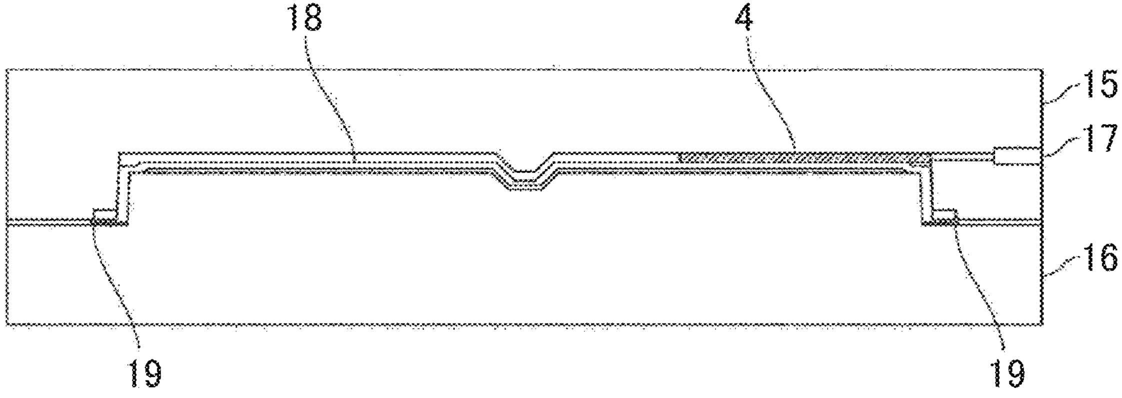
FIG. 12 is a schematic view showing an example of coating of the fiber-reinforced plastic by an in-mold coating method.

FIG. 8 is a schematic diagram of an example of a coating step. In FIG. 8, a through hole 12 is provided in the lower mold 6, and the fiber-reinforced plastic 7 is sucked by the vacuum pump 13 via the through hole 12, thereby the fiber-reinforced plastic 7 can be fixed, and it is possible to prevent the fiber-reinforced plastic 7 from moving during being pressed and to prevent the flow of the coating material 4 from being hindered.

The upper mold and the lower mold used in the coating step may be a combination of two or more of the above (a) to (c).

For example, when (a) and (c) are combined, the clearance generated when the upper mold and the lower mold used in the coating step are closed is larger than the clearance generated when the forming upper mold and the forming lower mold used when the fiber-reinforced plastic is molded are closed, and the lower mold has at least one through hole, and the pressing can be performed while the fiber-reinforced plastic is sucked by the vacuum pump via the through hole.

In addition, when (b) and (c) are combined, at least one convex portion is provided on the surface of the lower mold, and the lower mold has at least one through hole, and the pressing can be performed while the fiber-reinforced plastic is sucked by the vacuum pump via the through hole.

INDUSTRIAL APPLICABILITY

According to the present invention, it is possible to provide a method of manufacturing a coated fiber-reinforced plastic in which coating is performed on either of both surfaces and end surfaces of the fiber-reinforced plastic in a mold.

REFERENCE SIGNS LIST

- 1, 2, 7, 18 fiber-reinforced plastic
- S1 Top plane portion
- S2 Standing plane portion
- S3 Flange portion
- A1, A2 Planes corresponding to the first plane A
- B1, B2 Planes corresponding to the second plane B
- C1, C2 Planes corresponding to the end plane C
- 3 Hole
- 4 Coating material
- 5 Upper mold
- 6 Lower molds
- 8, 11 gap
- 9 Seal
- 10 Convex portion
- 12 Through hole
- 13 Vacuum pump
- 14 Molded body
- 15 Forming upper mold
- 16 Forming lower mold
- 17 Injection device
- 19 Burr
- 20 SMC

The invention claimed is:

1. A method for producing a coated fiber-reinforced plastic by pressing a coating material and a fiber-reinforced plastic using a pair of upper and lower molds, the fiber-reinforced plastic comprising at least a first surface A, a second surface B, and an end surface C connected to the first surface A and the second surface B, wherein the first surface A and the second surface B are surfaces each facing different molds when the fiber-reinforced plastic is pressed using the pair of upper and lower molds, and the coating material first comes into contact with at least a part of the first surface A and then comes into contact with at least a part of one of the second surface B and the end surface C to coat the fiber-reinforced plastic, wherein the upper mold is an upper mold for coating and the lower mold is a lower mold for coating, respectively, and the fiber-reinforced plastic is molded using a forming upper mold and a forming lower mold, then removed from the forming upper mold and the forming lower mold, and then pressed using the upper mold for coating and the lower mold for coating.

2. The method for producing a coated fiber-reinforced plastic according to claim 1, wherein the coating material first comes into contact with at least a part of the first surface A and then comes into contact with at least a part of the end surface C from the start of pressing to the end of pressing.

3. The method for producing a coated fiber-reinforced plastic according to claim 1, wherein the coating material first comes into contact with at least a part of the first surface A and then comes into contact with at least a part of the second surface B and at least a part of the end surface C from the start of pressing to the end of pressing.

4. The method for producing a coated fiber-reinforced plastic according to claim 1, wherein the fiber-reinforced plastic is deformed after being removed from the forming upper mold and the forming lower mold, and then pressed using the upper mold for coating and the lower mold for coating.

5. The method for producing a coated fiber-reinforced plastic according to claim 4, wherein the fiber-reinforced plastic contains a thermoplastic resin.

6. The method for producing a coated fiber-reinforced plastic according to claim 5, wherein the thermoplastic resin is a crystalline resin.

7. The method for producing a coated fiber-reinforced plastic according to claim 5, wherein the fiber-reinforced plastic is obtained by removing burrs after molding.

8. The method for producing a coated fiber-reinforced plastic according to claim 1, wherein the fiber-reinforced plastic is disposed in the lower mold, the coating material is coated on the fiber-reinforced plastic, and the pressing is started.

9. The method for producing a coated fiber-reinforced plastic according to claim 1, wherein the fiber-reinforced plastic is obtained by molding a sheet molding compound and then removing burrs.

10. The method for producing a coated fiber-reinforced plastic according to claim 9, wherein a clearance occurred when the upper mold and the lower mold are closed is larger than a clearance occurred when the forming upper mold and the forming lower mold used for molding the sheet molding compound are closed.

11. The method for producing a coated fiber-reinforced plastic according to claim 1, wherein the lower mold comprises at least one convex portion on a surface of the lower mold.

12. The method for producing a coated fiber-reinforced plastic according to claim 1, wherein the lower mold has at least one through hole, and the pressing is performed while the fiber-reinforced plastic is sucked by a vacuum pump via the through hole.

13. The method for producing a coated fiber-reinforced plastic according to claim 1, wherein the coating material is at least one selected from the group consisting of a primer coating material, an appearance design coating material, a conductive coating material, an electromagnetic wave shielding coating material, and a fire-resistant coating material.

14. The method for producing a coated fiber-reinforced plastic according to claim 1, wherein the coating material is a reactive coating material.

* * * * *